US012175337B2

(12) United States Patent
Gardner et al.

(10) Patent No.: US 12,175,337 B2
(45) Date of Patent: Dec. 24, 2024

(54) TECHNIQUES FOR EXTRACTING MACHINE-READABLE INFORMATION FROM P AND IDs

(71) Applicant: Bentley Systems, Incorporated, Exton, PA (US)

(72) Inventors: Marc-André Gardner, Quebec City (CA); Karl-Alexandre Jahjah, Quebec City (CA)

(73) Assignee: Bentley Systems, Incorporated, Exton, PA (US)

(*) Notice: Subject to any disclaimer, the term of this patent is extended or adjusted under 35 U.S.C. 154(b) by 1038 days.

(21) Appl. No.: 17/129,205

(22) Filed: Dec. 21, 2020

(65) Prior Publication Data

US 2022/0044146 A1 Feb. 10, 2022

Related U.S. Application Data

(60) Provisional application No. 63/060,881, filed on Aug. 4, 2020.

(51) Int. Cl.
*G06N 20/00* (2019.01)
*G06F 18/2415* (2023.01)
(Continued)

(52) U.S. Cl.
CPC ......... *G06N 20/00* (2019.01); *G06F 18/2415* (2023.01); *G06F 40/242* (2020.01);
(Continued)

(58) Field of Classification Search
CPC ......... G06N 20/00; G06N 5/04; G06N 3/045; G06N 3/08; G06F 18/2415; G06F 40/242; G06V 10/22; G06V 30/10; G06V 30/422
(Continued)

(56) References Cited

U.S. PATENT DOCUMENTS 5,594,809 A * 1/1997 Kopec .................. G06F 18/295
382/161
5,625,798 A 4/1997 Badders et al.
(Continued)

FOREIGN PATENT DOCUMENTS

EP 3660743 A1 * 6/2020 ......... G06F 16/9027
JP 3445394 B2 * 9/2003 ........... G06K 9/6211
(Continued)

OTHER PUBLICATIONS

U.S. Appl. No. 17/034,844, filed Sep. 28, 2020 by Marc-André Lapointe, et al. for Classifying Individual Elements of an Infrastructure Model, pp. 1-27.
(Continued)

*Primary Examiner* — Mahendra R Patel
(74) *Attorney, Agent, or Firm* — Cesari and McKenna, LLP; James A. Blanchette (57) ABSTRACT

In example embodiments, techniques are provided for using machine learning to extract machine-readable labels for text boxes and symbols in P&IDs in image-only formats. A P&ID data extraction application uses an optical character recognition (OCR) algorithm to predict labels for text boxes in a P&ID. The P&ID data extraction application uses a first machine learning algorithm to detect symbols in the P&ID and return a predicted bounding box and predicted class of equipment for each symbol. One or more of the predicted bounding boxes may be decimate by non-maximum suppression to avoid overlapping detections. The P&ID data extraction application uses a second machine learning algorithm to infer properties for each detected symbol having a remaining predicted bounding box. The P&ID data extraction application stores the predicted bounding box and a label including the predicted class of equipment and inferred properties in a machine-readable format.

19 Claims, 9 Drawing Sheets

(51) Int. Cl.
  *G06F 40/242* (2020.01)
  *G06N 5/04* (2023.01)
  *G06V 10/22* (2022.01)
  *G06V 30/10* (2022.01)

(52) U.S. Cl.
  CPC .............. *G06N 5/04* (2013.01); *G06V 10/22* (2022.01); *G06V 30/10* (2022.01)

(58) Field of Classification Search
  USPC ....................................................... 382/321
  See application file for complete search history.

(56) References Cited

U.S. PATENT DOCUMENTS

| | | | |
|---|---|---|---|
| 7,574,048 B2* | 8/2009 | Shilman | G06F 40/171 382/187 |
| 8,977,527 B2 | 3/2015 | McKim et al. | |
| 9,721,157 B2* | 8/2017 | Frank | G06V 30/422 |
| 9,811,251 B2 | 11/2017 | Kling et al. | |
| 11,501,470 B2* | 11/2022 | Hassan | G06T 9/002 |
| 2001/0033694 A1* | 10/2001 | Goodman | G06V 30/2264 382/229 |
| 2003/0130992 A1* | 7/2003 | Tyan | G06V 30/1444 707/E17.022 |
| 2005/0155030 A1* | 7/2005 | DeWitt | G06F 9/30181 712/E9.035 |
| 2007/0201752 A1* | 8/2007 | Gormish | G06V 30/40 382/232 |
| 2008/0052638 A1* | 2/2008 | Frank | G06V 30/422 715/808 |
| 2008/0063279 A1* | 3/2008 | Vincent | G06F 18/254 382/182 |
| 2009/0074300 A1* | 3/2009 | Hull | G06V 30/19147 382/209 |
| 2009/0100050 A1* | 4/2009 | Erol | G06F 16/434 707/999.005 |
| 2009/0292514 A1* | 11/2009 | McKim | G09B 19/003 703/6 |
| 2009/0313245 A1* | 12/2009 | Weyl | G06V 30/414 707/999.005 |
| 2011/0007366 A1* | 1/2011 | Sarkar | G06V 30/15 382/177 |
| 2012/0116559 A1* | 5/2012 | Davis | G06F 3/04886 700/94 |
| 2012/0134576 A1* | 5/2012 | Sharma | G06V 10/507 382/206 |
| 2012/0284012 A1* | 11/2012 | Rodriguez | G06F 3/017 455/556.1 |
| 2013/0173632 A1* | 7/2013 | Birdwell | G06F 16/2246 707/743 |
| 2014/0009612 A1 | 1/2014 | King | |
| 2014/0080428 A1* | 3/2014 | Rhoads | H04W 4/70 455/88 |
| 2014/0336992 A1 | 11/2014 | Kling et al. | |
| 2015/0269431 A1* | 9/2015 | Haji | G06V 40/30 382/186 |
| 2016/0161930 A1 | 6/2016 | Jirkovsky et al. | |
| 2017/0061031 A1 | 3/2017 | Jammikunta et al. | |
| 2017/0351708 A1* | 12/2017 | Lahmann | G06T 7/12 |
| 2018/0114101 A1* | 4/2018 | Desai | G06N 20/00 |
| 2019/0012424 A1* | 1/2019 | Brookshire | H05K 3/0005 |
| 2020/0005094 A1* | 1/2020 | Sinha | G06V 30/422 |
| 2020/0175211 A1* | 6/2020 | Kang | G06F 30/23 |
| 2020/0175372 A1* | 6/2020 | Sharma | G06F 16/9035 |
| 2020/0184278 A1* | 6/2020 | Zadeh | G06N 3/044 |
| 2021/0096523 A1 | 4/2021 | Stump et al. | |
| 2021/0174128 A1* | 6/2021 | Charnock | G06V 10/751 |
| 2021/0278960 A1 | 9/2021 | Mabote | |
| 2021/0279271 A1* | 9/2021 | Khanafer | G06T 7/162 |
| 2022/0319219 A1* | 10/2022 | Tsibulevskiy | G06V 30/226 |
| 2024/0119751 A1 | 4/2024 | Gardner et al. | |

FOREIGN PATENT DOCUMENTS

| | | | | |
|---|---|---|---|---|
| WO | WO-2014075174 A1 * | 5/2014 | ......... | G06K 9/00154 |
| WO | WO-2020005541 A1 * | 1/2020 | ......... | G06K 9/00442 |
| WO | WO-2021021624 A1 * | 2/2021 | ............. | G06F 18/40 |

OTHER PUBLICATIONS

U.S. Appl. No. 17/128,912, filed Dec. 21, 2020 by Karl-Alexandre Jahjah, et al. for Techniques for Labeling, Reviewing and Correcting Label Predictions for P&IDS, pp. 1-44.
Bunke, Horst, "Automatic Interpretation of Lines and Text in Circuit Diagrams," J. Kittler, K. S. Fu, and L. F. Pau (editors), D. Reidel Publishing Company, Pattern Recognition Theory and Applications, 1982, pp. 297-310.
Duda, Richard O., et al., "Use of the Hough Transformation to Detect Lines and Curves in Pictures," Association of Computing Machinery, Inc., Graphics and Image Processing, Communications of the ACM, vol. 15, No. 1, Jan. 1972, pp. 11-15.
Moon, Yoochan, et al., "Deep Learning-Based Method to Recognize Line Objects and Flow Arrows from Image-Format Piping and Instrumentation Diagrams for Digitization," MDPI, Applied Sciences, vol. 11, No. 10054, Oct. 27, 2021, pp. 1-21.
Moreno-García, et al., "New Trends on Digitisation of Complex Engineering Drawings," Springer, Neural Computing and Applications, vol. 31, Jun. 13, 2018, pp. 1695-1712.
Paliwal, Shubham, et al., "Digitize-PID: Automatic Digitization of Piping and Instrumentation Diagrams," arXiv, arXiv: 2109.03794v1 [cs.CV], Sep. 8, 2021, pp. 1-13.
U.S. Appl. No. 17/877,560, filed Jul. 29, 2022 by Marc-André Lapointe, et al. for Techniques for Extracting Links and Connectivity From Schematic Diagrams, pp. 1-37.
Yu, Eun-seop, et al., "Features Recognition from Piping and Instrumentation Diagrams in Image Format Using a Deep Learning Network," MDPI, Engines, vol. 12, No. 4425, Nov. 21, 2019, pp. 1-19.
Zhou, Xingyi, et al., "Objects as Points," arXiv, arXiv: 1904.07850v2 [cs.CV], Apr. 25, 2019, pp. 1-12.
"European Search Report and Written Opinion," European Application No. 21 150 316.4-1207, Applicant: Bentley Systems, Incorporated, Date of Mailing: Jun. 8, 2021, pp. 1-10.
"European Search Report and Written Opinion," European Application No. 21 150 319.8-1207, Applicant: Bentley Systems, Incorporated, Date of Mailing: Jun. 9, 2021, pp. 1-8.
Julca-Aguilar, Frank D., et al., "Symbol Detection in Online Handwritten Graphics Using Faster R-CNN," IEEE, 2018 13th IAPR International Workshop on Document Analysis Systems, Apr. 24, 2018, pp. 151-156.
Mani, Shouvik, et al., "Automatic Digitization of Engineering Diagrams using Deep Learning and Graph Search," IEEE, 2020 IEEE/CVF Conference on Computer Vision and Pattern Recognition Workshops (CVPRW), Jun. 14, 2020, pp. 673-679.
Rezvanifar, Alireza, et al., "Symbol Spotting on Digital Architectural Floor Plans Using A Deep Learning-Based Framework," IEEE, 2020 IEEE/CVF Conference on Computer Vision and Pattern Recognition Workshops (CVPRW), Jun. 14, 2020, pp. 2419-2428.

* cited by examiner

TECHNIQUES FOR EXTRACTING MACHINE-READABLE INFORMATION FROM P AND IDs

RELATED APPLICATIONS

This Application claims the benefit of U.S. Provisional Patent Application No. 63/060,881 by Marc-André Gardner et al., filed on Aug. 4, 2020 and titled "Techniques for Extracting Machine-Readable Information from P&IDs", the content of which are incorporated by reference herein in their entirety.

BACKGROUND

Technical Field

The present disclosure relates generally to the use of piping and instrumentation drawings (P&IDs) in plant and infrastructure projects, and more specifically to techniques for extracting machine-readable information from P&IDs in image-only formats.

Background Information

Figure 1:
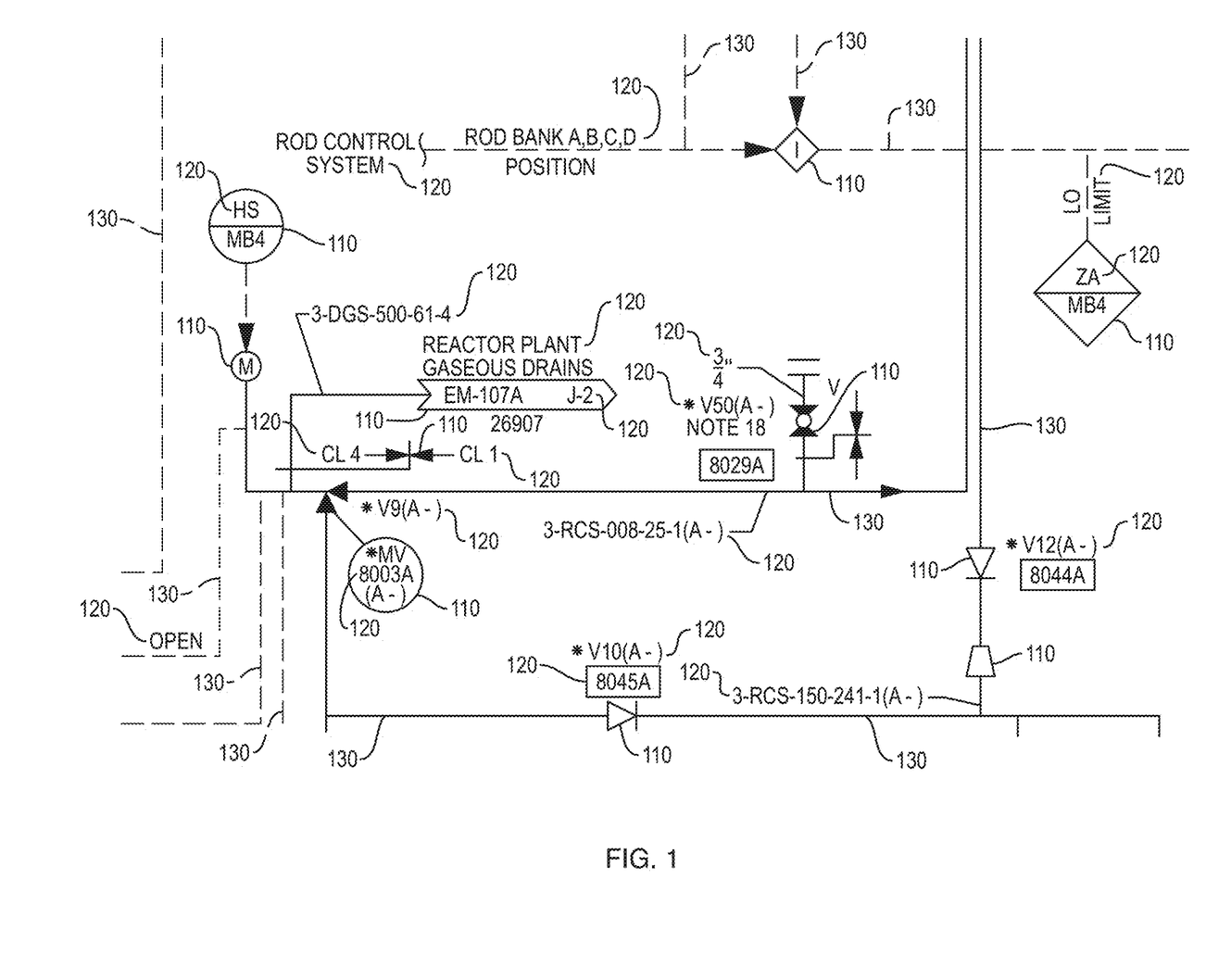
FIG. 1 is a view of a portion of an example P&ID.

A number of engineering fields utilize functional drawings. In contrast to a physical models that represent the specific location, size and shape of elements, a functional drawing is independent of location, size and shape, focusing instead on process flow. In the field of plant and infrastructure design and maintenance, a common type of functional drawing is a P&ID. FIG. 1 is a view of a portion of an example P&ID 100. The P&ID includes symbols 110 which represent elements (e.g., valves, pumps, vessels, instruments, etc.), text boxes 120 which provide descriptions of the elements (e.g., names, codes, properties, etc.), connections 130 that represent connections between elements (e.g., pipes, electrical wires, etc.), as well as other information (e.g., title blocks, legends, notes, etc.) (not shown).

A typical plant or infrastructure project may have hundreds of related P&IDs that have been created over the course of many years. These P&IDs often may be available in an image-only format (e.g., as a graphics file such as a JPG or PNG, or as an image-only PDF, etc.) that lacks machine-readable information (e.g., metadata) about the symbols, text boxes and connections represented therein. Sometimes the image-only P&ID originated from a scan of a printed document and is of poor quality, having low resolution, visual artifacts, obscured or blurry portions and the like.

In an image-only format, information in a P&ID is hard to validate and difficult to consume. There is an increasing desire to create digital twins of plants and infrastructure, and the information in P&IDs is often useful in creating such models. However, as the information in an image-only format is largely inaccessible to design and modeling applications, obtaining such information has often involved lengthy manual review and data entry. Even updating a P&ID itself is difficult with an image-only format.

One possible approach to address the problem of P&IDs in image-only formats is to manually recreate each P&ID in a design application. A human operator looks at an image-only P&ID and manually recreates every text box, symbol, connection, etc. he or she sees using the tools provided by the design application. The result is a new P&ID that includes machine-readable information describing the text boxes, symbols and connections, etc. Manual recreation can take hours, or tens of hours, depending on the complexity of the P&ID, rendering it impractical in many use cases. Further, manual recreation is inherently error prone due to its detailed yet repetitive nature. Significant additional time and effort may be needed to check and validate manually recreated P&IDs to ensure an acceptable level of accuracy.

Another possible approach to address the problem of P&IDs in image-only formats is to attempt to use a pattern recognition algorithm to determine information in each P&ID. The pattern recognition algorithm may search the P&ID for exact (pixel-by-pixel identical) copies of a set of cropped images from an image library. Upon finding an exact copy, information associated with the cropped image in the image library may be associated with the exact copy. While theoretically such an approach may build a set of machine-readable information for a P&ID in an image-only format, in practice the approach is largely unworkable. To operate successfully the pattern recognition algorithm requires a library of cropped images that are identical to everything in the P&ID. Since P&IDs often contain variations in how text boxes, symbols, connections, etc. are represented, in practice a new image library may need to be custom created for every, or nearly every, P&ID. Further, pattern recognition algorithms may be easily confused when a P&ID has low resolution, includes visual artifacts, has obscured or blurry portions or is otherwise of low quality. In such cases, images that ideally should identically match may not actually identically match, which may lead to missed identifications.

Accordingly, there is a need for improved techniques for extracting machine-readable information from P&IDs in image-only formats.

SUMMARY

In various embodiments, techniques are provided for using machine learning to extract machine-readable labels for text boxes and symbols in P&IDs in image-only formats (e.g. JPG, PNG, image-only PDF, etc.). The information in each label is predicted with a respective confidence level. Machine learning algorithms are adapted and extended to address challenges presented by P&IDs.

In one embodiment, a P&ID data extraction application uses an optical character recognition (OCR) algorithm to predict labels for text boxes in a P&ID in an image-only format. The P&ID data extraction application uses a first machine learning algorithm to detect symbols in the P&ID, the detecting returning a predicted bounding box and predicted class of equipment for each symbol. One or more of the predicted bounding boxes may be decimated by non-maximum suppression to avoid overlapping detections. The P&ID data extraction application uses a second machine learning algorithm to infer properties for each detected symbol having a remaining predicted bounding box. The P&ID data extraction application stores, for each detected symbol having a remaining predicted bounding box, the predicted bounding box and a label including the predicted class of equipment and inferred properties in a machine-readable format.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which.

DETAILED DESCRIPTION

Figure 2:
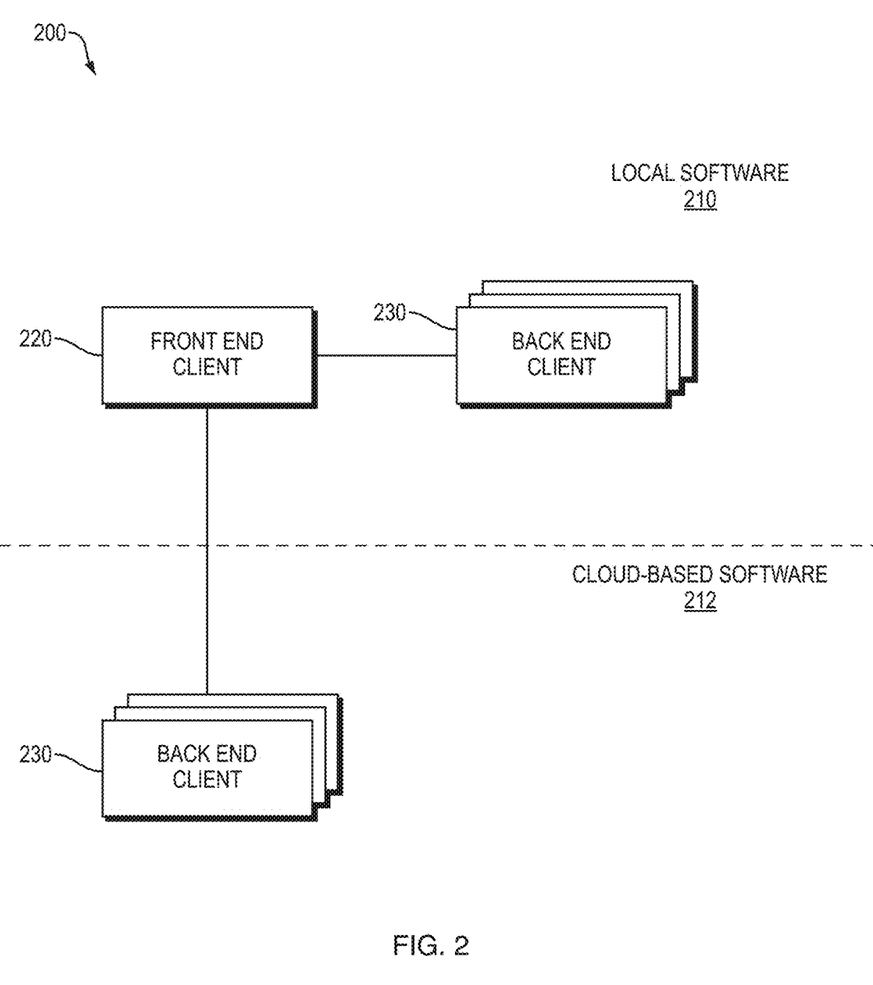
FIG. 2 is a high-level block diagram of an example P&ID data extraction application.

FIG. 2 is a high-level block diagram of an example P&ID data extraction application. The P&ID data extraction application 200 may be a stand-alone software application or a component of a larger software application, for example, a design and modeling software application. The software may be divided into local software 210 that executes on one or more computing devices local to an end-user (collectively "local devices") and, in some cases, cloud-based software 212 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 210 may include a frontend client 220 and one or more backend clients 230 operating on a local device. The cloud-based software 212 may include, in some cases, one or more backend clients 230 operating on cloud computing devices. The frontend client 220 may provide user interface functionality as well as perform certain non-processing intensive operations. The backend client(s) 230 may perform certain more processing intensive operations (e.g., OCR operations, machine learning operations, etc.). The front-end client 220 and backend client(s) 230 may operate concurrently on different tasks, such that a user may utilize the user interface of the P&ID data extraction application 200 to perform tasks while one or more backend clients 230 are performing different tasks, and without waiting for their completion.

Figure 3:
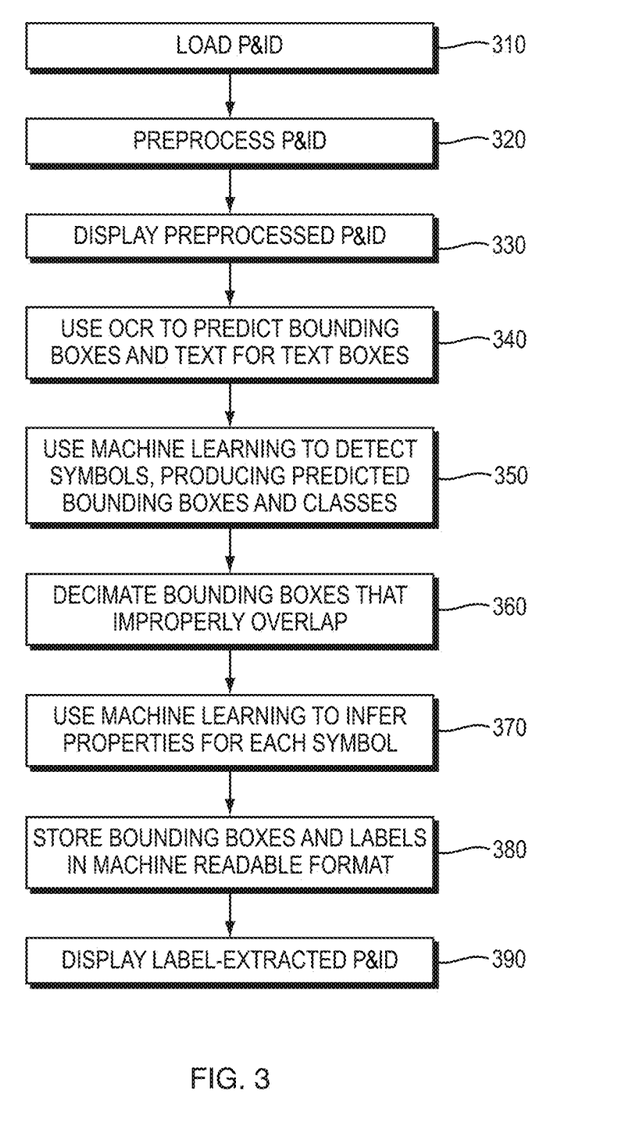
FIG. 3 is a high level sequence of steps for extracting machine-readable labels for text boxes and symbols in P&IDs in image-only formats.

FIG. 3 is a high level sequence of steps 300 for extracting machine-readable labels for text boxes and symbols in P&IDs in image-only formats. At step 310, the P&ID data extraction application 200 loads a P&ID in image-only format (e.g. JPG, PNG, image-only PDF, etc.) that lacks machine-readable information about the text boxes, symbols and connections. In some cases the P&ID originated from a scan of a printed document.

At step 320, the P&ID data extraction application 200 preprocess the P&ID to rasterize, resize and/or binarize the P&ID. Rasterization may involve decompression, conversion, and/or extraction operations to produce a rasterized P&ID. Resizing may involve changing resolution (e.g., dots-per-inch (DPI)) to a resolution more easily processed (e.g., by an OCR algorithm, machine learning algorithm, etc.). Binarization may involve using an adaptive threshold to reduce color or grayscale information in the P&ID to black and white (i.e. binary information). As a further part of step 320, the P&ID data extraction application 200 may also apply noise reduction and image geometry correction. Noise reduction may involve applying filters to remove noise from the P&ID (e.g., which may have been introduced by scanning a paper document) without sacrificing an undue amount or real detail. Image geometry correction may involve correcting shear, rotation, or other types of deformations (e.g., which may have been introduced by scanning a paper document).

Figure 4:
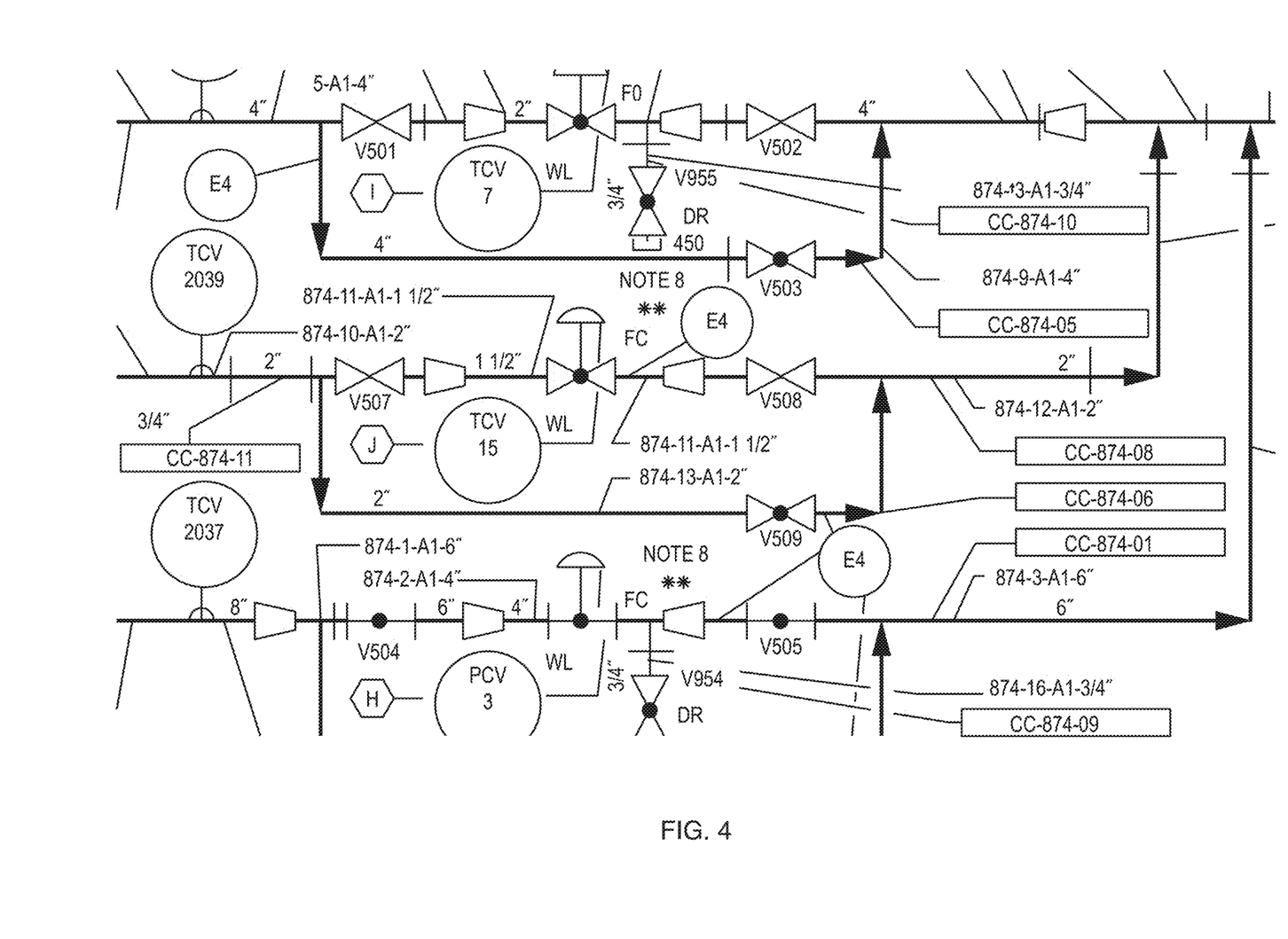
FIG. 4 is a view of a portion of an example preprocessed P&ID that may be displayed in the user interface of the P&ID data extraction application.

At step 330, which may be optional, the P&ID data extraction application 200 may display the preprocessed P&ID within a window of its user interface while machine-readable labels are being extracted in subsequent steps. FIG. 4 is a view of a portion of an example preprocessed P&ID 400 that may be displayed in the user interface of the P&ID data extraction application 200. At this stage text boxes and symbols are not readily extracted from the underlying image.

At step 340, the P&ID data extraction application 200 employs an OCR algorithm to predict bounding boxes that surround, and text within, each text box in the P&ID. The OCR algorithm may be implemented by an OCR architecture (e.g., FormRecognizer of Microsoft Azure Cognitive Services) adapted to P&ID characteristics. In general, the operation of OCR algorithms may be divided into three primary stages: a physical layout analysis stage, a text recognition stage, and a language modeling stage. In the physical layout stage the OCR algorithm divides the image into non-text regions and text lines and places bounding boxes around the text lines. In the text recognition stage the OCR algorithm recognizes text contained within each text line, and represents possible recognition alternatives as a hypothesis graph. Recognition may involve segmenting each text line into individual characters, extracting features from individual character images and classifying the individual character images based on the extracted features. In the language modeling stage the OCR algorithm may select among the recognition alternatives based on knowledge about language, vocabulary and grammar.

The language modeling stage may use statistical language models, such as dictionaries, n-gram patterns, stochastic grammars and the like. The language modeling stage may be adapted to P&ID characteristics. First, rather than use a general dictionary, a domain-specific dictionary may be used to bias predictions towards words and codes expected in P&IDs. The domain-specific dictionary may be an industry-wide dictionary based on general knowledge of words and codes used in P&IDs of a given industry, or may be a user-specific dictionary based on a particular list of words and codes used by the user in their P&IDs. Second, domain-specific patterns of n-grams may be used to prevent bias against words and codes expected in P&IDs, but uncommon in general text (e.g., the numeral "0" together with letters, which may commonly be misinterpreted as the letter "0" given patterns of general text, the numeral "1" together with letters, which may commonly be misinterpreted as the letter "1" given patterns in general text, etc.). Domain-specific patterns of n-grams may be custom coded or extracted from P&IDs that have been successfully processed and validated.

At step 350, the P&ID data extraction application 200 employs a machine learning algorithm to detect symbols in the P&ID and produce a set of a predicted bounding boxes and predicted classes of equipment. The machine learning algorithm may involve a region-based convolutional neural network object detection architecture (e.g., the Faster Region-based Convolutional Neural Network (R-CNN) architecture) that is adapted to handle P&ID characteristics. An object detection framework (e.g., the Dectectron2 framework) may implement the architecture.

Figure 5:
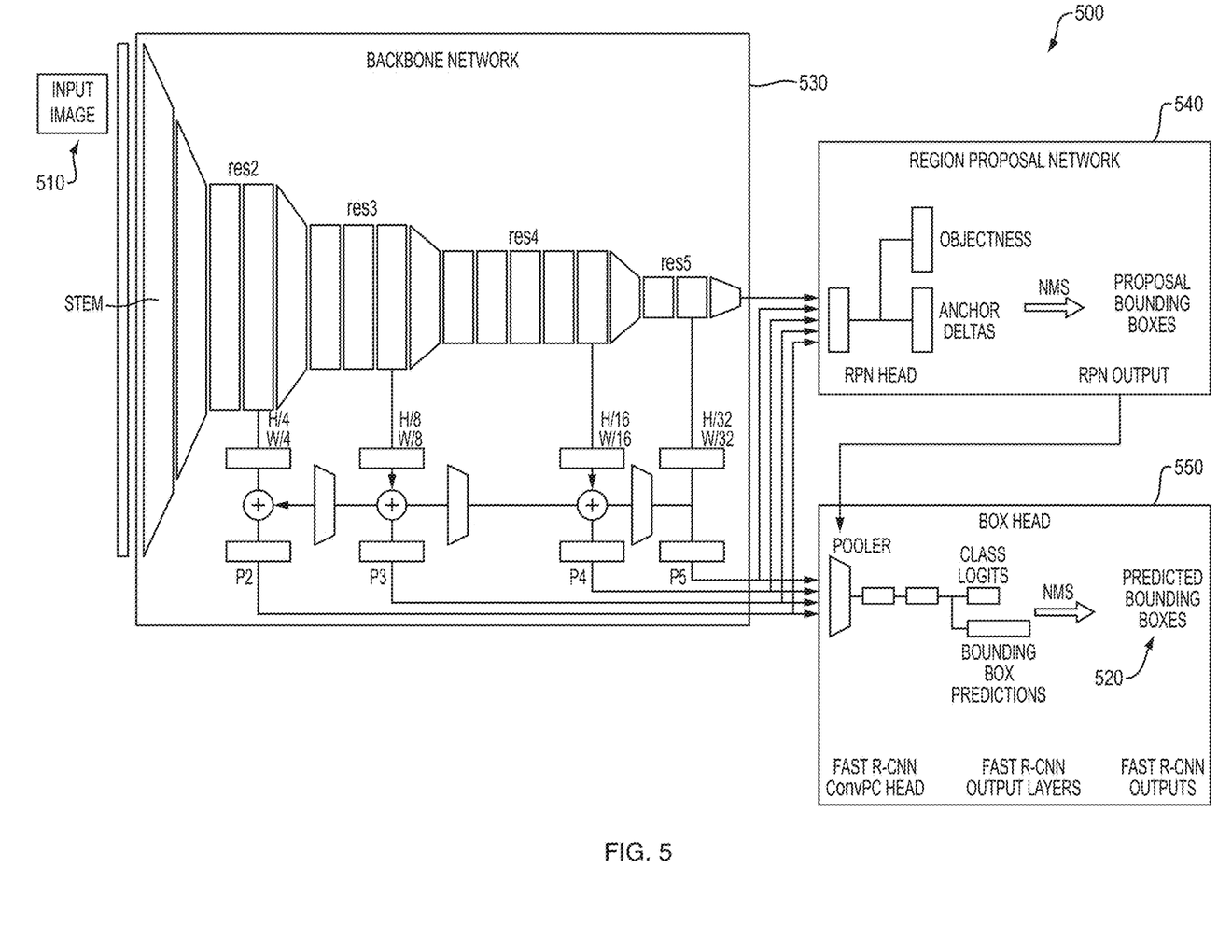
FIG. 5 is a diagram of an example region-based convolutional neural network object detection architecture (e.g., a Faster R-CNN architecture) that may be adapted to handle P&ID characteristics.

FIG. 5 is a diagram 500 of an example region-based convolutional neural network object detection architecture (e.g., a Faster R-CNN architecture) 500 that may be adapted to handle P&ID characteristics. In general, the architecture takes the preprocessed P&ID as an input image 510 and produces a set of predicted bounding box, predicted classes and confidences as an output 520. The architecture 500 includes three primary portions: a feature pyramid network 530, a region proposal network (RPN) 540 and a box head 550. The feature pyramid network 530 extracts feature maps from the input image at different scales. The RPN 540 detects object regions from the multi-scaled feature maps. The box head 550 crops regions of feature maps using proposal boxes into multiple fixed-size features, obtains bounding box locations and classification results and filters these to produce a final output of bounding boxes and classes.

More specifically, the input image 510 is set to a predetermined image dimensions. In general applications the smallest image dimension may be set to 600 to 800 pixels. In order to have adequate resolution to "see" all symbols in a P&ID, the smallest image dimension may be increased to a larger value (e.g., 1200 pixels).

The feature pyramid network 530 includes a residual neural network (Resnet) having a stem block and stages that each contain multiple bottleneck blocks. Each bottleneck block includes multiple convolution layers. The layers may also include an input layer and an output layer. Every layer may include a predetermined number of filters. To better handle P&ID characteristics, the number of filters in the input layer may be increased and the number of filters in each output layer may be decreased from that used in general applications. The bottleneck blocks and their layers generally operate to connect high-to-low resolution convolutions in series. To better detect both very large objects (e.g., that may occupy 20-30% of the total P&ID) and very small ones (e.g., that occupy only a few pixels), the number of resolutions may be expanded (e.g., adding at least one resolution above and at least one resolution below) beyond the range of resolutions used in general applications.

The output of the feature pyramid network 530 is a set of multi-scale feature maps with different receptive fields which are received by the RPN 540. The RPN 540 includes a RPN head that processes the feature maps to produce an objectness map and anchor deltas map. Eventually, up to a predetermined number of proposal bounding boxes are chosen. Typically this is done by applying proposed anchor deltas to the corresponding anchors, sorting proposed bounding boxes by objectness scores, and selecting the top scored boxes from each feature level. In general applications, the predetermined number for proposal bounding boxes is generally 1000. To better handle P&IDs that may have hundreds of symbols, the number may be increased (e.g., to 2500).

The set of multi-scale feature maps from the feature pyramid network 530 and the proposal bounding boxes from the RPN 540 are received by the box head 550. A region of interest (ROI) pooling process crops (pools) regions of feature maps that are specified by the proposal bounding boxes into multiple fixed-size features. Then the cropped regions are fed to a head network having layers which classify objects in the regions and fine tune bounding box positions and shapes. Up to a predetermined number of predicted bounding boxes and predicted classes are inferred, and confidences determined. In general applications the predetermined number for predicted bounding boxes is generally 100. To better handle P&IDs that may have hundreds of symbols, the number may be increased (e.g., to 784).

Figure 6:
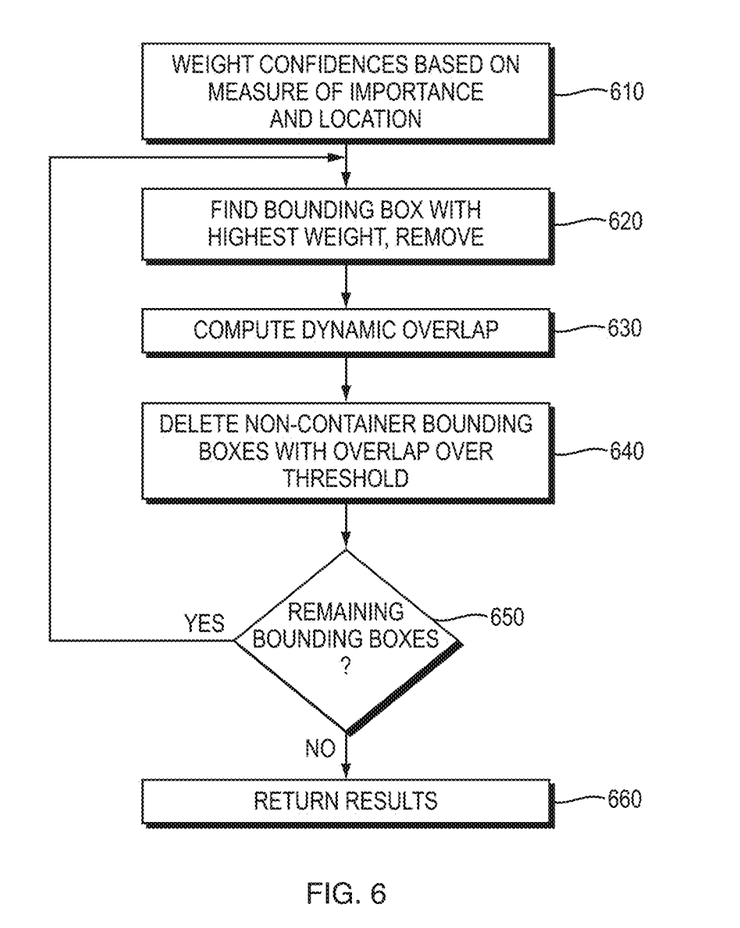
FIG. 6 is a flow diagram of an example sequence of steps for a modified non-maximum suppression algorithm.

Returning to FIG. 3, at step 360, the P&ID data extraction application 200 employs a modified non maximum suppression algorithm to decimate any predicted bounding boxes that are determined to improperly overlap. The non-maximum suppression algorithm may be optimized to better handle P&IDs. FIG. 6 is a flow diagram of an example sequence of steps for a modified non-maximum suppression algorithm. The modified non-maximum suppression algorithm takes as input a set of predicted bounding boxes, associated classes and confidences. At step 610, the algorithm weights the confidences of each bound box based on a measure of importance of the associated class and their location. The measure of importance may be predefined based on typical patterns in P&IDs in an industry or P&IDs of a specific user. At step 620, the modified non maximum suppression algorithm finds the bounding box with the highest weighted confidence in the set of predicted bounding boxes, removes it from that set, and places it in an output set. At step 630, the modified non maximum suppression algorithm computes a dynamic overlap of other bounding boxes of the set of predicted bounding boxes and the bounding box with the highest weighted confidence. In contrast to a traditional overlap calculation, dynamic overlap considers the shape of the symbol enclosed within each bounding box (e.g., a round symbol within a rectangular bounding box) and adjusts calculated overlap based on the shapes. Such adjustment may be based on a calculation of the actual overlap given the shape of each bounding box or on various rules of thumb or approximations of overlap given the shapes. At step 640, the modified non maximum suppression algorithm deletes all bounding boxes from the set of predicted bounding boxes with a calculated overlap greater than a predetermined threshold, provided that such predicted bounding boxes are not associated with a symbol having a class that is designated as a container (i.e. a symbol whose class indicates it is intended to include other symbols). At step 650, the modified non maximum suppression algorithm determines whether there are any remaining bounding boxes in the set of predicted bounding boxes (i.e. that have not been placed in the output set or deleted). If so, execution loops to step 620. If not, at step 660, the output set is returned and decimation of improperly overlapping bounding boxes is complete.

Figure 7:
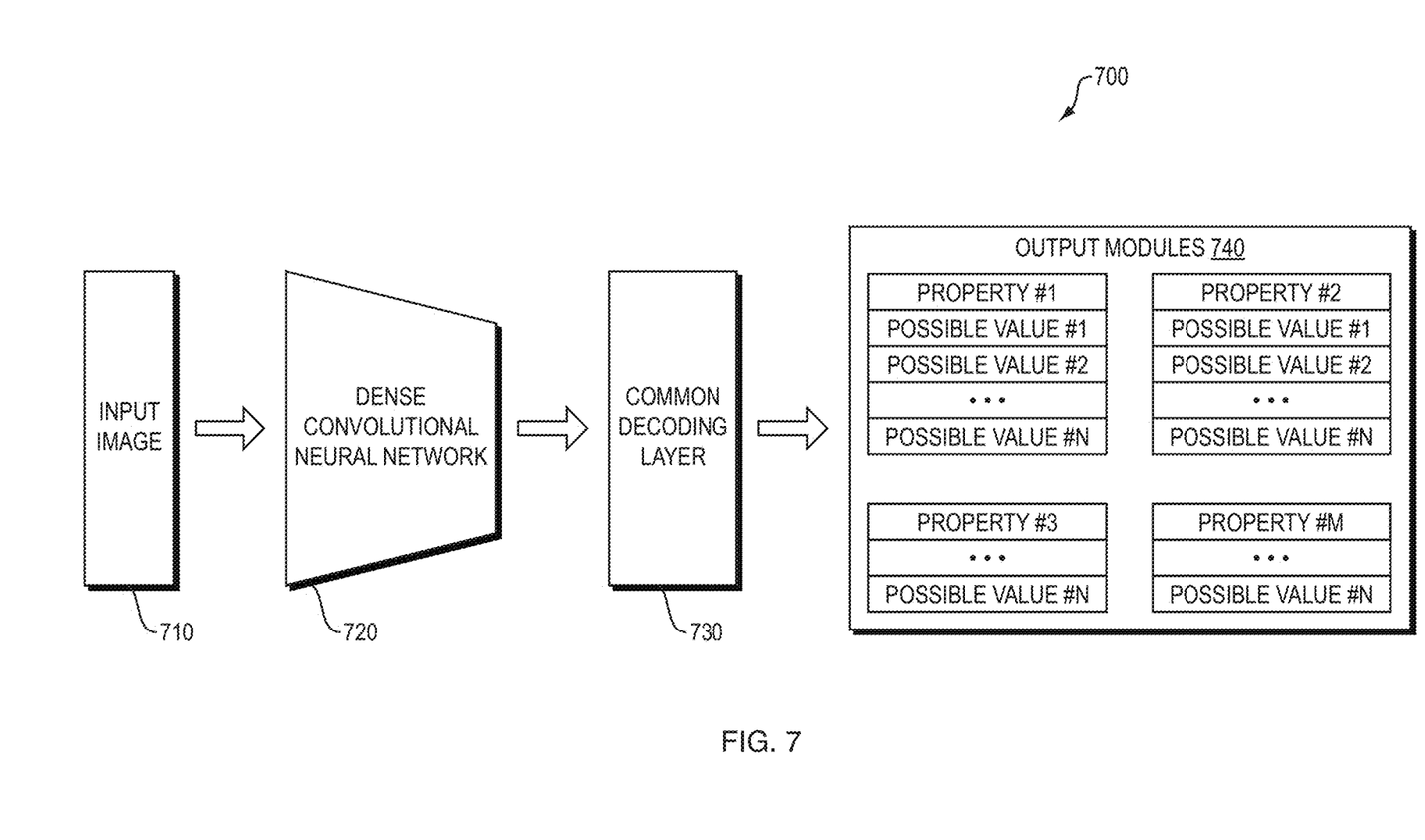
FIG. 7 is a diagram illustrating use of a deep neural network architecture adapted for properties classification.

At step 370, the P&ID data extraction application 200 employs a machine learning algorithm to infer properties for each symbol having a predicted bounding box that remains after improperly overlapping bounding boxes have been decimated. The machine learning algorithm may be based on a deep neural network architecture adapted for properties classification implemented by a framework (e.g., the PyTorch framework). The framework may enable features such as n-dimensional tensor computation with acceleration and automatic differentiation. FIG. 7 is a diagram 700 illustrating use of a deep neural network architecture adapted for properties classification. The deep neural network architecture receives a portion of the P&ID detected as a symbol by step 350 as an input image 710. The input image is applied to a dense convolutional neural network (e.g., a DenseNet Backbone) 720. Whereas convolutional networks typically have one connection between each layer and its subsequent layer, each layer of the dense convolutional neural network may receive feature maps of all preceding layers as inputs, and provide its own feature maps as inputs of all subsequent layers. The outputs of the dense convolutional neural network 720 are provided to a common decoding layer 730, which may be a fully-connected layer. The common decoding layer 730 produces output modules 740 that include a variable number of properties depending on the class, and for each property a variable number of possible values and a confidence in each possible value. For example, for the class "valve" there may be 8 distinct properties (e.g., type, openness, operation mode, number of inlets, regulation mode, angle, fail type, and connection type). Each of these 8 distinct properties may have a number of possible values ranging from 2 to 11. Each value has an associated confidence to be the correct value. Given that the number of possible choices is finite, the confidences always sum to 100%. For example, assuming a property has 3 possible values, the confidences may be 79.6%, 19.5% and 0.9%. While the deep neural network architecture may return all possible values, only those having a confidence that exceeds a predetermined threshold may be utilized.

At step 380, P&ID data extraction application 200 constructs labels from the predicted classes of equipment and inferred properties, and stores bounding boxes and labels in a machine-readable format in memory. The machine-readable format may be separate from the image-only format, for example, a JSON file related to, but separate from, the JPG file, PNG file, or image-only PDF file that includes the P&ID image. Alternative, the machine-readable format may be integrated into a file that stores the P&ID image.

Figure 8:
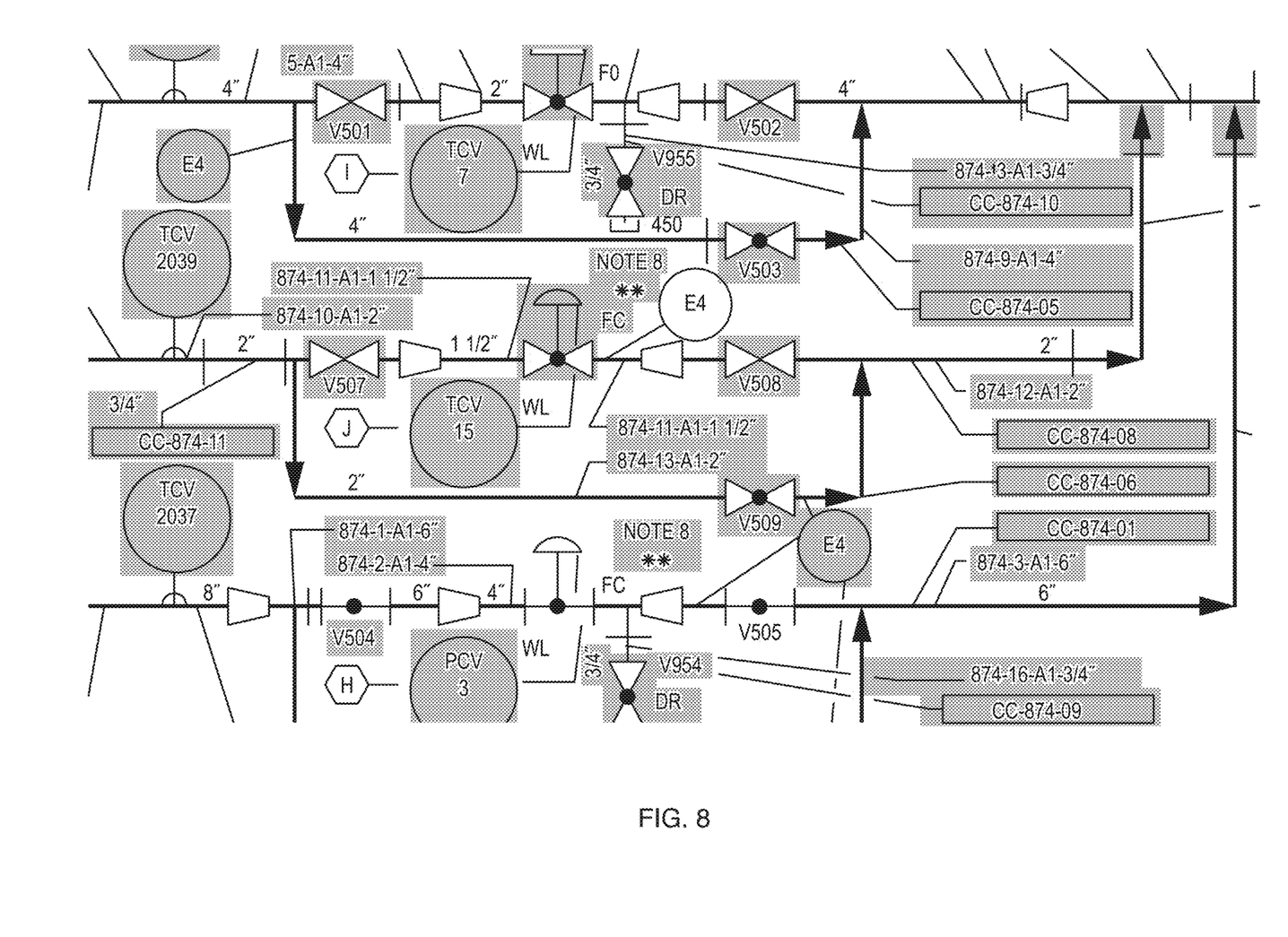
FIG. 8 is a view of a portion of an example label-extracted P&ID that may be displayed in the user interface of the P&ID data extraction application.

Depending on the use case, the machine-readable format may be used in various ways. At step 390, which may be optional, the P&ID data extraction application 200 may display the label-extracted P&ID within a window of its user interface. FIG. 8 is a view of a portion of an example label-extracted P&ID 800 that may be displayed in the user interface of the P&ID data extraction application 200. Bounding boxes for text boxes and symbols are visually represented by overlays (e.g., colored highlighting). Labels may be displayed in ancillary windows of the user interface (not shown) for user confirmation or correction. The machine-readable format may additionally, or alternatively, be provided to a design and modeling application (e.g., for use in building a model/digital twin or for other purposes).

Figure 9:
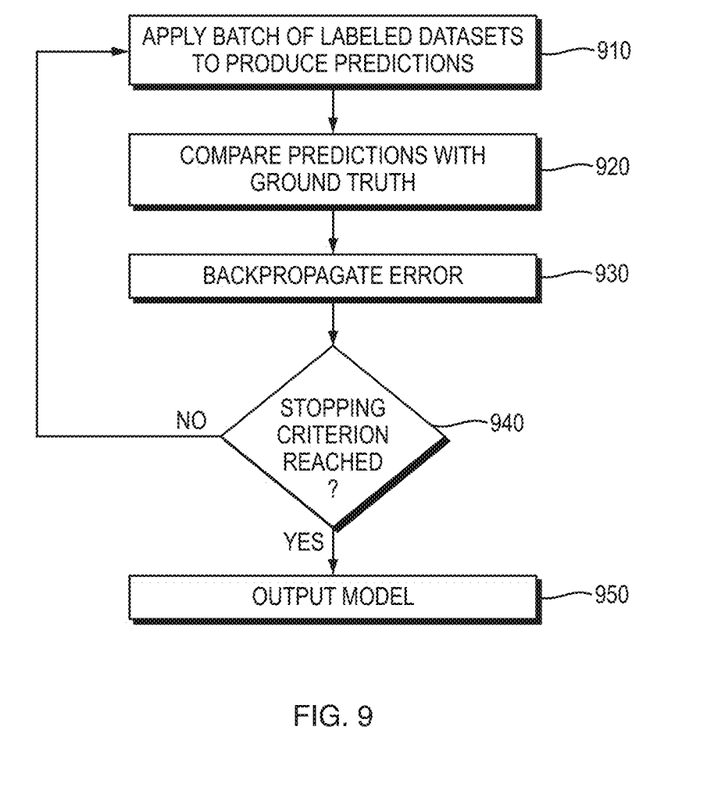
FIG. 9 is a flow diagram of an example sequence of steps for training a neural network of the P&ID data extraction application to detect symbols.

Prior to using the neural networks described above in connection with steps 350 and 370, the neural networks need to be trained on a number of labeled samples. Labeled samples may be produced in various manners. In some cases, labeled samples may be generated by a special labeling application that includes automation and support for increasing efficiency of repetitive tasks common to labeling P&IDs. In other cases, labeled samples may be produced using traditional techniques. FIG. 9 is a flow diagram of an example sequence of steps 900 for training a neural network of the P&ID data extraction application 200 to detect symbols. At step 910, a batch of labeled samples (e.g., 4) are received and applied to the current model which attempts to detect symbols. In some cases, a labeled sample may be subject to a randomized cropping to avoid showing the same thing to the neural network when iterative operations are performed. At step 920, the output (prediction) is compared to the labels of the sample which represent ground truth. A set of loss values is computed to indicate how close or far the model is from the desired output. In general applications uncommon classes are given lesser importance. To better handle P&IDs where some symbols are much more prevalent than others, the loss values may be altered to give higher weights to samples that are part of uncommon classes. At step 930, errors made by the model are analyzed and back propagated. The model parameters are adjusted to avoid the observed errors. At step 940, the performance of the model is computed using another labeled sample (which has not yet been seen during training) and the performance compared to predetermined level of performance. Additionally, a run time is compared to predetermined time limit. If neither condition is met, execution loops to step 910 and training continues with a new batch of labeled samples. If either condition is met, it is treated as a stopping criterion, and training is concluded and the model output at step 950.

It should be understood that various adaptations and modifications may be readily made to what is described above, to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:
1. A method for extracting machine-readable labels for text boxes and symbols in piping and instrumentation drawings (P&IDs) in image-only formats, comprising:
   predicting, by an optical character recognition (OCR) algorithm of a P&ID data extraction application executing on a computing device, bounding boxes and text for text boxes in a P&ID in an image-only format, wherein the OCR algorithm uses a domain-specific dictionary in language modeling, the domain-specific dictionary based on knowledge of words and codes used in P&IDs in a given industry or based on a particular list of words and codes known to be used by a specific user in P&IDs;
   detecting, by a first machine learning algorithm of the P&ID data extraction application, symbols in the P&ID, the detecting to return a predicted bounding box and predicted class of equipment for each symbol;
   decimating one or more of the predicted bounding boxes to avoid overlapping detections;
   inferring, by a second machine learning algorithm of the P&ID data extraction application, properties for each detected symbol having a remaining predicted bounding box; and
   storing, in a machine-readable format in a memory of the computing device, for each detected symbol having a remaining predicted bounding box, the predicted bounding box and a label including the predicted class of equipment and inferred properties.

2. The method of claim 1, wherein the detecting produces a confidence in each predicted bounding box and associated predicted label, and the inferring produces a confidence in each property, and the storing stores each confidence.

3. The method of claim 1, further comprising:
preprocess, by the P&ID data extraction application, the P&ID to at least one of rasterize, resize or binarize the P&ID.

4. The method of claim 1, wherein the OCR algorithm uses domain-specific patterns of n-grams in language modeling to prevent bias against words and codes expected in P&IDs.

5. The method of claim 1, wherein the first machine learning algorithm of the P&ID data extraction is based on a region-based convolutional neural network object detection architecture.

6. The method of claim 5, wherein the region-based convolutional neural network object detection architecture is a Faster Region-based Convolutional Neural Network (R-CNN) architecture.

7. The method of claim 5, wherein the region-based convolutional neural network object detection architecture is adapted to use enlarged image dimensions, use an increased number of filters in an input layer and a decreased number of filters in an output layer, consider an expanded number of resolutions, to give higher weights to samples that are part of uncommon classes in a loss calculation or to use an increased number of proposal bounding boxes and predicted bounding boxes.

8. The method of claim 1, wherein the decimating uses a non-maximum suppression algorithm.

9. The method of claim 8, wherein the non-maximum suppression algorithm includes operations for:
weighting confidences of each bounding box based on a measure of importance of an associated class and location;
computing a dynamic overlap of other bounding boxes and a bounding box with highest weighted confidence; and
deleting bounding boxes with a calculated dynamic overlap greater than a predetermined threshold.

10. The method of claim 1, wherein the second machine learning algorithm of the P&ID data extraction is based on a deep neural network architecture adapted for properties classification.

11. The method of claim 1, wherein the Einferring produces a variable number of properties for each symbol, and each property has a variable number of property values.

12. The method of claim 1, wherein the machine-readable format is a JavaScript Object Notation (JSON) file associated with the P&ID.

13. The method of claim 1, further comprising:
displaying the predicted labels for the text boxes and symbols in a user interface of the P&ID data extraction application.

14. A computing device comprising:
a display screen;
a processor; and
a memory coupled to the processor and configured to store a piping and instrumentation drawing (P&ID) in image-only format and a P&ID data extraction application, the P&ID data extraction application when executed operable to:
predict, using optical character recognition (OCR), bounding boxes and text for text boxes in the P&ID, wherein the OCR uses a domain-specific dictionary in language modeling, the domain-specific dictionary based on knowledge of words and codes used in P&IDs in a given industry or based on a particular list of words and codes known to be used by a specific user in P&IDs,
detect, using machine learning, symbols in the P&ID and return a predicted bounding box and predicted class of equipment for each detected symbol,
infer, using machine learning, properties for each detected symbol, and
store, for each detected symbol, the predicted bounding box and a label including the predicted class of equipment and inferred properties in a machine-readable format in the memory.

15. The computing device of claim 14, wherein the P&ID data extraction application when executed is further operable to produce a confidence in each predicted bounding box and associated predicted label, produce a confidence in each property, and store each confidence in the memory.

16. A non-transitory computing device readable medium having instructions stored thereon, the instructions when executed by one or more computing devices operable to:
predict, using optical character recognition (OCR), bounding boxes and text for text boxes in a piping and instrumentation drawing (P&ID) in an image-only format, wherein the OCR uses at least one of a domain-specific dictionary or domain-specific patterns of n-grams in language modeling, the domain-specific dictionary or domain-specific patterns of n-grams being based on knowledge of words and codes used in P&IDs in a given industry;
detect, using machine learning, symbols in the P&ID and return a predicted bounding box and predicted class of equipment for each symbol;
decimate one or more of the predicted bounding boxes to avoid overlapping detections;
infer, using machine learning, properties for each detected symbol having a remaining predicted bounding box; and
store in a machine-readable format, for each detected symbol having a remaining predicted bounding box, the predicted bounding box and a label including the predicted class of equipment and inferred properties.

17. The non-transitory electronic-device readable medium of claim 16, wherein the instructions when executed are further operable to:
produce a confidence in each predicted bounding box and associated predicted label, produce a confidence in each property, and store each confidence.

18. The non-transitory electronic-device readable medium of claim 16, wherein the instructions when executed are further operable to:
preprocess the P&ID to at least one of rasterize, resize or binarize the P&ID.

19. The non-transitory electronic-device readable medium of claim 15, wherein the machine learning used in detecting symbols employs a region-based convolutional neural network object detection architecture, the decimation uses a non-maximum suppression algorithm, and the machine learning used in inferring properties uses a deep neural network architecture.

* * * * *

UNITED STATES PATENT AND TRADEMARK OFFICE
CERTIFICATE OF CORRECTION

| | | |
|---|---|---|
| PATENT NO. | : 12,175,337 B2 | Page 1 of 1 |
| APPLICATION NO. | : 17/129205 | |
| DATED | : December 24, 2024 | |
| INVENTOR(S) | : Marc-André Gardner et al. | |

It is certified that error appears in the above-identified patent and that said Letters Patent is hereby corrected as shown below:

In the Specification

Column 5, Line 1 reads:
"which may commonly be misinterpreted as the letter "0""
Should read:
--which may commonly be misinterpreted as the letter "O"--

Column 5, Line 4 reads:
""1" given patterns in general text, etc.). Domain-specific"
Should read:
--"I" given patterns in general text, etc.). Domain-specific--

Signed and Sealed this
Eleventh Day of March, 2025

Coke Morgan Stewart
*Acting Director of the United States Patent and Trademark Office*